Figure 1:
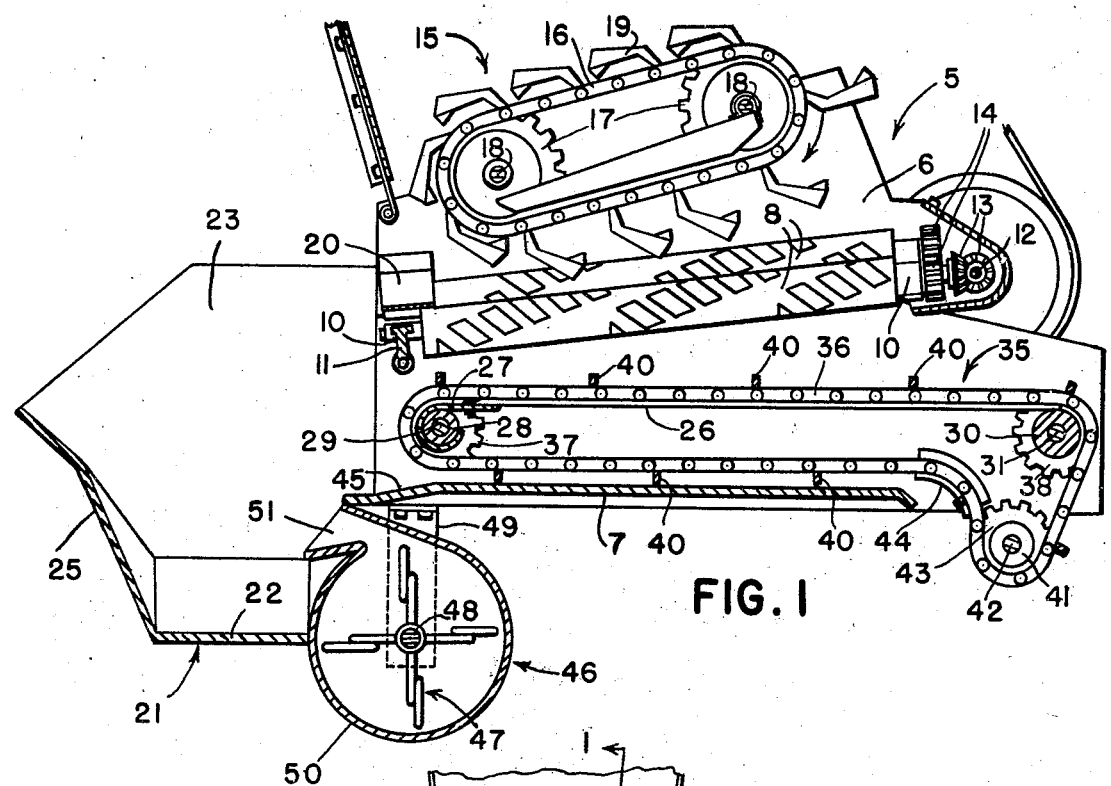

Oct. 6, 1942.  W. J. COULTAS ET AL  2,298,198
HUSKING AND CLEANING MECHANISM
Original Filed Jan. 28, 1939

INVENTORS:
Wilbur J. Coultas
Norman F. Andrews
ATTORNEYS

UNITED STATES PATENT OFFICE 2,298,198

HUSKING AND CLEANING MECHANISM

Wilbur J. Coultas and Norman F. Andrews, Moline, Ill., assignors to Deere & Company, Moline, Ill., a corporation of Illinois Original application January 28, 1939, Serial No. 253,386, now Patent No. 2,264,565, dated December 2, 1941. Divided and this application June 30, 1941, Serial No. 400,450

2 Claims. (Cl. 130—5)

The present invention relates generally to husking and cleaning mechanism, with particular reference to apparatus associated with corn harvesting implements for receiving the ears of corn snapped from the stalks by suitable picking mechanism, removing the husks and silks therefrom, separating any kernels of shelled corn from the husks, silks and other trash, and delivering the ears and shelled kernels to a suitable hopper from which they are generally conveyed to a wagon or truck drawn alongside or behind the corn harvester. A corn harvesting implement of this type is disclosed and claimed in a co-pending application, which issued December 2, 1941, as Patent No. 2,264,565, of which this application is a division.

Mechanical corn pickers, in order to harvest corn efficiently, must be adapted to raise fallen corn stalks from the ground in order to obtain the ears therefrom, and therefore are likely to gather a certain amount of dirt and other trash which is delivered to the husking rolls together with any dried leaves and pieces of stalks which may be broken away by the action of the snapping rolls. In order to insure that this dirt and trash is not delivered to the wagon with the ears and any shelled corn that is dislodged from the cobs, it is desirable to provide means for cleaning the corn after it is husked but before it is delivered to the wagon. Various methods of providing blasts of air for clearing away this dirt and trash have been used and are well-known to those skilled in the art. Heretofore, it has been difficult to provide cleaning fans at locations in which an air blast can be directed in such a manner that an efficient cleaning of the corn is accomplished, due to the fact that space is limited, especially in the case of tractor-mounted corn pickers, in which the husking mechanism is usually located above the rear axle housing of the tractor between the tractor seat and the rear drive wheels, as shown in the above-mentioned patent. It is the principal object of this invention, therefore, which is concerned with the provision of a cleaning fan with an exhaust duct so positioned as to thoroughly clean not only the ears of corn from the husking rolls but also the kernels of corn that may be dislodged with the husks and are separately delivered to the hopper after having been separated from the husks. In the accomplishment of this object, a cleaning fan is located directly underneath the husking rolls and shelled corn conveyor with an exhaust duct adapted to direct a blast of air rearwardly through the path of the falling ears and kernels of corn into the hopper, the blast of air being directed upwardly and rearwardly across the upper portion of the hopper to carry any dirt and trash rearwardly over the rear wall of the hopper. The location of the fan under the rear end of the husking box is advantageous for the reason that this location does not interfere with other parts of the apparatus or, in the case of a tractor-mounted corn picker, with the parts of the tractor.

Figure 2:
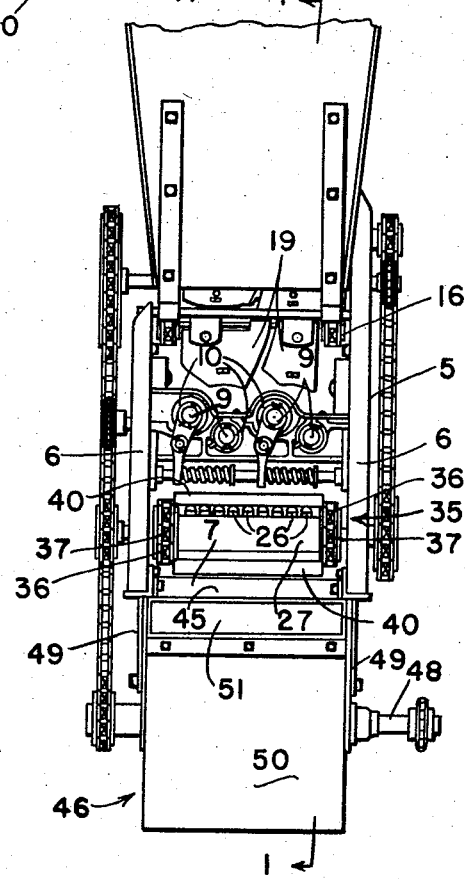

These and other objects and advantages of the present invention will be apparent to those skilled in the art after a consideration of the following description, in which reference is had to the drawing appended hereto, in which Figure 1 is a sectional elevational view of a husking device embodying the principles of the present invention, as viewed along a line 1—1 in Figure 2; and Figure 2 is an end elevational view of the rear end of the husking device with the hopper removed.

Referring now to the drawing, the husking box, indicated generally by reference numeral 5, comprises a pair of vertical side walls 6 and a floor plate 7 disposed generally horizontally between the walls 6. A plurality of husking rolls 8, carried on suitable shafts 9, are disposed longitudinally within the husking box 5 and are inclined downwardly toward the rear end of the box. The shafts 9 project from opposite ends of the husking rolls 8 and are journaled in suitable bearings 10 supported in transverse frame members 11 from the side walls 6 in a manner well-known to those skilled in the art. The husking rolls 8 are driven from a common transverse drive shaft 12 through bevel gears 13 at the forward ends of the rolls and each pair of rolls 8 is interconnected by spur gears 14 in the usual manner.

The ears of corn are delivered to the husking rolls at the raised forward ends of the latter and are moved toward the lower rear ends of the rolls by means of an ear conveyor 15, of any suitable conventional type. In the embodiment shown herein, the conveyor comprises a flexible endless chain member 16 trained over a pair of sprockets 17, which are rotatably supported on shafts 18 and have a plurality of paddles 19 pivotally connected thereto. As indicated by the arrow, the flexible member travels rearwardly, the paddles 19 swing downwardly into engagement with the ears of corn and move the latter toward the rear ends of the husking rolls and over a plate 20 covering the rear bearings 10 of the husking rolls. The ears fall from the plate 26 downwardly and rearwardly into a hopper 21, comprising a bottom 22, side walls 23, and a rear wall 25. The rear wall is inclined upwardly and rearwardly from the bottom wall 22, for purposes which will be explained later. The husking rolls 8 of each pair rotate in opposite directions in a well-known manner, gripping the husks and stripping the latter from the ears. The husks drop from the rolls onto a grate 26 comprising a plurality of laterally spaced longitudinally extending rods bolted at their rear ends to a supporting plate 27, which is curved around a rear roller 28. This roller is mounted on a shaft 29, which is journaled at opposite ends thereof in suitable bearings in the two side walls 6 of the husking box 5. The forward ends of the rods rest upon a forward roller 30 supported on a shaft 31 which is also journaled at opposite ends, respectively, in the side walls 6 of the husking box 5.

The husks and leaves and other large pieces of trash are swept forwardly along the grate 26 by means of a flexible endless conveyor 35, the upper flight of which moves forwardly along the rods and comprises a pair of laterally spaced chains 36 trained over a pair of sprockets 37 mounted on the rear conveyor shaft 29 at opposite ends of the roller 28, respectively, and over a second pair of sprockets 38 which are mounted at opposite ends of the roller 30 on the shaft 31, respectively. The chains 36 are interconnected by a plurality of transversely extending blades or paddles 40, which sweep along the rods 26 and move any husks, silks or other trash forwardly along the rods 26 and discharge them over the forward roller 30, from which the flexible endless conveyor passes downwardly over an idler roller 41 mounted on a suitable shaft 42 and supporting a pair of suitable sprockets 43 to receive the chains 36. The chains pass upwardly from the sprockets 43 and over a pair of arcuate tracks 44 at opposite sides of the husking box 5 and from there extend rearwardly to the rear sprockets 37. The lower flight of the conveyor 35 passes over the floor plate 7 of the husking box, the transverse blades 40 sweeping along the surface of the plate 7. The rods 26 are spaced apart to provide slots through which kernels of corn are permitted to fall to the floor plate 7, but the leaves and husks are retained upon the rods for discharge from the forward end of the conveyor, as explained heretofore.

The rear end of the floor plate 7 is inclined rearwardly and downwardly at 45, over which the kernels of corn slide off the rear end of the plate 7 and drop into the hopper 21. Naturally, any small particles of dirt and other impurities which fall through the grate 26 are swept rearwardly into the hopper 21 with the kernels. These impurities are removed by a strong blast of air generated by a fan 46 comprising a rotor 47 mounted on a shaft 48, which is carried on a pair of laterally spaced brackets 49 depending from the sides of the husking box 5. The fan rotor 47 is mounted within a fan housing 50, provided with an exhaust duct 51. The exhaust duct 51 faces upwardly and rearwardly directly beneath the rear end of the floor plate 7 and serves to direct a strong blast of air through the stream of kernels of corn falling from the plate 7 into the hopper 21. The blast of air continues upwardly and rearwardly through the ears of corn falling from the rear ends of the husking rolls into the hopper 21. The particles of dirt and light pieces of leaves and other trash are blown upwardly and rearwardly over the rearwardly inclined back wall 25 of the hopper 21.

We claim:

1. In husking mechanism, a plurality of husking rolls disposed side by side over which ears of corn move longitudinally rearwardly thereon, a hopper at the rear end of said rolls to receive the ears that pass rearwardly and downwardly from the rear ends of the rolls, means below said rolls for conveying husks to a point of discharge upon the ground and for separating any shelled kernels from the husks and discharging the kernels into said hopper, and a fan having an exhaust duct positioned beneath said kernel discharge means and facing rearwardly to direct a blast of air rearwardly through the ears and through the kernels passing into said hopper.

2. In husking mechanism, a plurality of husking rolls disposed side by side over which ears of corn move longitudinally rearwardly thereon, a hopper at the rear end of said rolls to receive the ears that fall from the rear ends of the rolls, a grate beneath said rolls for catching husks and permitting any shelled kernels to drop therethrough, a floor plate beneath said grate for catching said kernels, a flexible endless conveyor having an upper flight movable forwardly over said grate for clearing away said husks and a lower flight movable rearwardly over said floor plate for sweeping said kernels into said hopper, and a fan having an exhaust duct positioned beneath said floor plate and facing rearwardly to direct a blast of air rearwardly through both said ears and said kernels as they fall into said hopper.

WILBUR J. COULTAS.
NORMAN F. ANDREWS.